United States Patent
Kawamura

(10) Patent No.: US 9,740,044 B2
(45) Date of Patent: Aug. 22, 2017

(54) SET OF POLARIZING PLATES HAVING A YOUNG'S MODULUS AND FRONT-PLATE-INTEGRATED LIQUID CRYSTAL DISPLAY PANEL COMPRISING THE SAME

(71) Applicant: Sumitomo Chemical Company, Limited, Tokyo (JP)

(72) Inventor: Takahito Kawamura, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 15/028,246

(22) PCT Filed: Oct. 1, 2014

(86) PCT No.: PCT/JP2014/076870
§ 371 (c)(1),
(2) Date: Apr. 8, 2016

(87) PCT Pub. No.: WO2015/053296
PCT Pub. Date: Apr. 16, 2015

(65) Prior Publication Data
US 2016/0246114 A1 Aug. 25, 2016

(30) Foreign Application Priority Data
Oct. 10, 2013 (JP) ................. 2013-212681

(51) Int. Cl.
*G02F 1/1335* (2006.01)
*G02B 5/30* (2006.01)
*G02F 1/13363* (2006.01)

(52) U.S. Cl.
CPC .... *G02F 1/133528* (2013.01); *G02F 1/13363* (2013.01); *G02B 5/3033* (2013.01);
(Continued)

(58) Field of Classification Search
CPC ..... G02F 2001/133562; G02F 2201/54; G02F 2001/133567; G02F 1/0311; G02F 1/116;
(Continued)

(56) References Cited

U.S. PATENT DOCUMENTS

2003/0151705 A1* 8/2003 Saiki .................. G02B 5/3083
349/96
2007/0165170 A1 7/2007 Fukuda
(Continued)

FOREIGN PATENT DOCUMENTS

CN 101096579 A 1/2008
CN 102262314 A 11/2011
(Continued)

OTHER PUBLICATIONS

Office Action issued Sep. 6, 2016 in JP Application No. 2013-212681.
(Continued)

*Primary Examiner* — Paul Lee
(74) *Attorney, Agent, or Firm* — Panitch Schwarze Belisario & Nadel LLP

(57) ABSTRACT

Provided are a set of polarizing plates comprising a front-plate-integrated polarizing plate to be disposed at a viewing side of a liquid crystal cell and a back-side polarizing plate to be disposed at a back side of the cell, and a front-plate-integrated liquid crystal display panel including the set of polarizing plates. The front-plate-integrated polarizing plate including a front-side polarizing plate and a front plate disposed at a viewing side of the front-side polarizing plate, being stuck via an ultraviolet curing type resin or a pressure sensitive adhesive, and having a Young's modulus of at least 2 GPa. A distance d1 to the liquid crystal cell from the surface of a polarizer of the front-side polarizing plate is
(Continued)

larger than a distance d2 to the liquid crystal cell from the surface of a polarizer of the back-side polarizing plate.

11 Claims, 2 Drawing Sheets

(52) U.S. Cl.
CPC ............ *G02F 2001/133562* (2013.01); *G02F 2001/133567* (2013.01); *G02F 2201/54* (2013.01); *G02F 2202/28* (2013.01)

(58) Field of Classification Search
CPC ........ B29D 11/00644; B32B 17/10458; B32B 2307/42; G01J 5/0825; G02B 6/0056; G02B 6/02109; G03F 9/7065; H01L 51/5293; H04B 10/532
See application file for complete search history.

(56) References Cited

U.S. PATENT DOCUMENTS

| | | | |
|---|---|---|---|
| 2008/0143949 A1* | 6/2008 | Ino | G02F 1/133308 349/151 |
| 2011/0013115 A1 | 1/2011 | Kajita | |
| 2011/0157525 A1* | 6/2011 | Yamasaki | B32B 7/12 349/96 |
| 2012/0113356 A1* | 5/2012 | Yu | G02B 5/305 349/62 |
| 2013/0004700 A1 | 1/2013 | Jo et al. | |
| 2013/0169911 A1 | 7/2013 | Haida et al. | |

FOREIGN PATENT DOCUMENTS

| | | |
|---|---|---|
| JP | H02-27121 U | 2/1990 |
| JP | 2001033775 A | 2/2001 |
| JP | 2002221715 A | 8/2002 |
| JP | 2006292939 A | 10/2006 |
| JP | 2007133350 A | 5/2007 |
| JP | 2007171782 A | 7/2007 |
| JP | 2008203400 A | 9/2008 |
| JP | 2009103818 A | 5/2009 |
| JP | 2010060618 A | 3/2010 |
| JP | 2011022510 A | 2/2011 |
| JP | 4666430 B2 | 4/2011 |
| JP | 2011248363 A | 12/2011 |
| JP | 2012053079 A | 3/2012 |
| JP | 2012058429 A | 3/2012 |
| JP | 2012128384 A | 7/2012 |
| JP | 2013011853 A | 1/2013 |
| JP | 2013015811 A | 1/2013 |
| JP | 2013152465 A | 8/2013 |
| JP | 2013156315 A | 8/2013 |
| JP | 2013185121 A | 9/2013 |

OTHER PUBLICATIONS

Office Action issued Oct. 4, 2016 in JP Application No. 2013-212681.
International Search Report issued Dec. 16, 2014 in International Application No. PCT/JP2014/076870.
Office Action issued Dec. 15, 2015 in JP Application No. 2013212681.
Notification issued Mar. 29, 2016 in JP Application No. 2013-212681.
Office Action issued May 10, 2016 in JP Application No. 2013-212681.
Office Action dated Jun. 14, 2017 in CN Application No. 201480055804.X.

* cited by examiner

SET OF POLARIZING PLATES HAVING A YOUNG'S MODULUS AND FRONT-PLATE-INTEGRATED LIQUID CRYSTAL DISPLAY PANEL COMPRISING THE SAME

CROSS-REFERENCE TO RELATED APPLICATION

This application is a Section 371 of International Application No. PCT/JP2014/076870, filed Oct. 1, 2014, which was published in the Japanese language on Apr. 16, 2015, under International Publication No. WO 2015/053296 A1, and the disclosure of which is incorporated herein by reference.

TECHNICAL FIELD

The present invention relates to a set of polarizing plates that is formed of a front-plate-integrated polarizing plate having a front plate integrated therewith and a back-side polarizing plate and suppresses a warping amount in a high temperature environment when presented in a liquid crystal display panel and a front-plate-integrated liquid crystal display panel in which these polarizing plates are stuck on a liquid crystal cell.

BACKGROUND ART

Liquid crystal display devices have conventionally been used for desk calculators, electronic clocks, personal computers, etc. and in recent years there is an increasing demand therefor, and recently they are also applied to a wide range of applications such as mobile phones, tablet type terminals and the like. These liquid crystal display devices normally have a liquid crystal cell with a pair of polarizing plates disposed on the front and back sides of the liquid crystal cell to serve as a liquid crystal display panel.

In the recent market, as mobile devices such as mobile phones and tablet type terminals having a screen increased in size are widely used, there is a demand for reduction in weight and thickness of a constituent member thereof, namely a liquid crystal display panel, and there is a tendency to reduce a liquid crystal cell's glass, a front plate and/or the like in thickness. Furthermore, in order to eliminate reflection and scattering of light at an interface to enhance visibility, there is also a tendency to integrate the front plate with the liquid crystal display panel using a pressure sensitive adhesive, an ultraviolet curing type resin or the like.

Conventional liquid crystal display panels have a thick front plate and a thick liquid crystal cell, and their warping resulting from a polarizing plate's shrinkage has thus been suppressed even in high temperature environments. The above-mentioned recent tendency to reduce in thickness the front plate, the glass used for a liquid crystal cell and the like, however, results in warping of the liquid crystal display panel in use in high temperature environments, and it cannot be accommodated in a casing for a final product or other similar problems arise.

In order to suppress such warping of a liquid crystal display panel, a methodology has previously been developed to suppress the warping of the liquid crystal display panel by changing in thickness a polarizing plate to be disposed at the viewing side of a liquid crystal cell and a polarizing plate disposed on a side of the liquid crystal cell opposite to the viewing side (i.e., a back side thereof). For example, Japanese Patent Laying-Open No. 2012-058429 (PTD 1) describes a method for suppressing a liquid crystal display panel's warping by reducing the thickness of a polarizing film (a polarizer as referred to in the present invention) of a polarizing plate to be disposed at the viewing side of a liquid crystal cell to be smaller than the thickness of a polarizing film to be disposed at the back side of the liquid crystal cell.

However, a liquid crystal display panel's warping caused when the panel is used in a high temperature environment is attributed to a polarizing plate's shrinkage that depends upon a polarizer's thickness, as has been set forth above, and when the polarizer of the polarizing plate to be disposed at the viewing side is reduced in thickness, as described in PTD 1, a liquid crystal display panel having a front plate integrated using a pressure sensitive adhesive or an ultraviolet curing type resin or the like for improved visibility, in particular, may warp, and suppression of warping is thus not necessarily satisfactory.

Furthermore, Japanese Patent No. 4666430 (PTD 2) describes a liquid crystal display device which uses a plastic substrate liquid crystal cell (a liquid crystal display panel as referred to in the present invention) in which protective layers configuring polarizing plates disposed on the viewing side and back side of the liquid crystal cell are changed in thickness to suppress the plastic substrate liquid crystal cell's warping amount. This method does accomplish the purpose of suppressing warping of a liquid crystal cell. However, when the device is placed in a high temperature environment with the polarizing plate having the front plate integrated therewith for improved visibility, the method as described in PTD 2 wherein the protective layers are changed in thickness may cause the problems that the liquid crystal cell may be warped by the protective layer's thermal shrinkage and the device cannot be accommodated in a casing for a final product.

CITATION LIST

Patent Documents

PTD 1: Japanese Patent Laying-Open No. 2012-58429
PTD 2: Japanese Patent No. 4666430 (Japanese Patent Laying-Open No. 2002-221715)

DISCLOSURE OF THE INVENTION

The present invention has been made to solve the above conventional issue, and a main object of the present invention is to provide a set of polarizing plates that can suppress an amount of warping in a high temperature environment when applied in a liquid crystal display panel, and a front-plate-integrated liquid crystal display panel in which the set of polarizing plates are stuck on a liquid crystal cell.

More specifically, the present invention is a set of polarizing plates comprising a front-plate-integrated polarizing plate to be disposed at a viewing side of a liquid crystal cell, and a back-side polarizing plate to be disposed at a back side of the liquid crystal cell, the front-plate-integrated polarizing plate including a front-side polarizing plate and a front plate, the front plate being disposed at a viewing side of the front side polarizing plate, being stuck via an ultraviolet curing type resin or a pressure sensitive adhesive, and having a Young's modulus equal to or greater than 2 GPa, a distance to the liquid crystal cell from that surface of a polarizer of the front-plate-integrated polarizing plate which is farther away from the front plate being larger than a distance to the liquid crystal cell from that surface of a polarizer of the back-side polarizing plate which is closer to the front plate.

The distance to the liquid crystal cell from that surface of the polarizer of the front-plate-integrated polarizing plate which is farther away from the front plate (d1) typically corresponds to a thickness of a stack of at least one transparent polymer film and at least one pressure sensitive adhesive layer laminated on that surface of the polarizer of the front-plate-integrated polarizing plate which is farther away from the front plate. The distance to the liquid crystal cell from that surface of the polarizer of the back-side polarizing plate which is closer to the front plate (d2) typically corresponds to a thickness of a pressure sensitive adhesive layer or a stack of the pressure sensitive adhesive layer and a transparent polymer layer laminated on that surface of the polarizer of the back-side polarizing plate which is closer to the front plate.

The distance to the liquid crystal cell from that surface of the polarizer of the front-plate-integrated polarizing plate which is farther away from the front plate (d1) and the distance to the liquid crystal cell from that surface of the polarizer of the back-side polarizing plate which is closer to the front plate (d2) may be any distance that can satisfy the relationship of d1>d2, and although the upper and tower limit values of d1 and d2 are not limited, normally, d1 is up to approximately 100 μm, and d2 is 5 μm or more. d1 and d2 have a difference, or d1−d2, preferably of 95 μm or less.

The set of polarizing plates can take the following various embodiments each alone or in combination.

In the set of polarizing plates, both the front- and back-side polarizing plates are typically each a polarizing plate having a polarizer composed of a polyvinyl alcohol-based resin film having at least one surface with a protective layer composed of a transparent polymer film laminated thereon.

The transparent polymer film may be a transparent polymer film which has an in-plane phase retardation.

The front-side polarizing plate attic set of polarizing plates may be provided, at the side of its polarizer farther away from the front plate, with another phase retardation plate composed of a transparent polymer film.

The back-side polarizing plate of the set of polarizing plates may be provided, at the side of its polarizer farther away from the front plate, with an optical film other than the transparent polymer film.

In the set of polarizing plates, preferably, a total thickness of the transparent polymer film(s) that the front-side polarizing plate has is larger than a total thickness of the transparent polymer film(s) that the back-side polarizing plate has.

In the set of polarizing plates, the front-side polarizing plate and the back-side polarizing plate both have a rectangular shape having a longer side and a shorter side, and preferably the front-side polarizing plate has an absorption axis approximately parallel to a direction of the shorter side and the back-side polarizing plate has an absorption axis approximately parallel to a direction of the longer side.

The set of polarizing plates has the front-plate-integrated polarizing plate configuring the set of polarizing plates, stuck, at its polarizing plates side, on the viewing side of the liquid crystal cell and has the back-side polarizing plate configuring the set of polarizing plates, stuck on the back side of the liquid crystal cell to form a front-plate-integrated liquid crystal display panel. The front-plate-integrated liquid crystal display panel is a front-plate-integrated liquid crystal display panel having a warping amount in absolute value of 0.5 mm or less when heated at 85° C. for 240 hours.

The present invention can thus provide a front-plate-integrated liquid crystal display panel that can resolve warping in a high temperature environment of a liquid crystal display panel having a front plate integrated therewith and can be accommodated in a casing of a final product in the high temperature environment.

DESCRIPTION OF EMBODIMENTS

Hereinafter, while a set of polarizing plates and a front-plate-integrated liquid crystal display panel using the same according to the present invention will be described with reference to the figures, as appropriate, the present invention is not limited to these embodiments.

Figure 1:
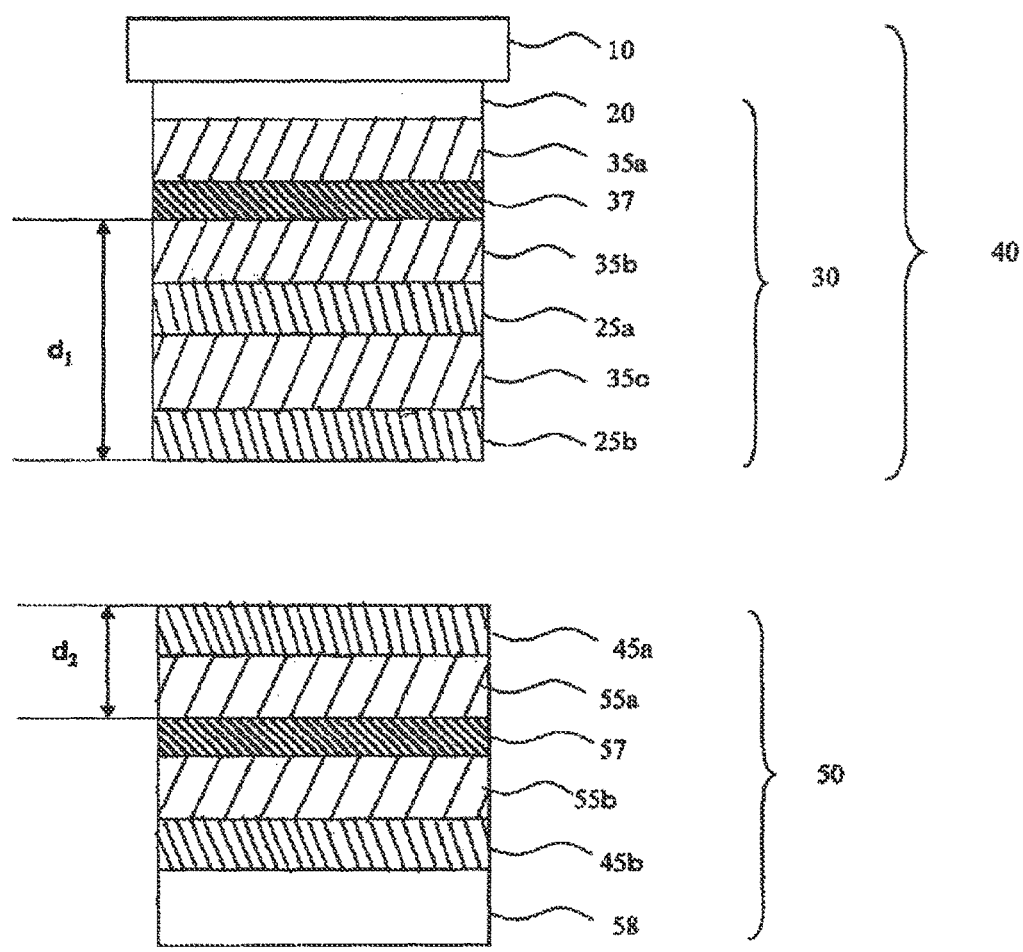
FIG. 1 is a cross-sectional view schematically showing an example of a preferable layer configuration in a set of polarizing plates according to the present invention.

The set of polarizing plates of the present invention including a front-plate-integrated polarizing plate and a back-side polarizing plate. FIG. 1 is a cross-sectional view schematically showing an example of a preferable layer configuration in the set of polarizing plates according to the present invention. Reference will first be made to FIG. 1 for description. A front-plate-integrated polarizing plate 30 configuring the set of polarizing plates of the present invention to be disposed at a viewing side of a liquid crystal cell and composed of a front-side polarizing plate 30 and a front plate 10 disposed at a side farther away from the liquid crystal cell and stuck on front-side polarizing plate 30 via an ultraviolet curing type resin or pressure sensitive adhesive 20. Front-side polarizing plate 30 includes a polarizer 37 having opposite surfaces with transparent protective layers 35a and 35b, respectively, stuck thereon. Furthermore, a back-side polarizing plate 50 includes a polarizer 57 having opposite surfaces with transparent protective layers 55a and 55b, respectively, stuck thereon.

The front plate is provided to have a Young's modulus equal to or greater than 2 GPa to play a role of suppressing the liquid crystal cell's warping, protecting the liquid crystal cell, and the like. As long as the above Young's modulus is satisfied, the front plate may be a monolayer or a multilayer structure. The front plate is disposed at the viewing side of the liquid crystal cell, as has been discussed above, more specifically, at an outermost surface in a final product, and it is thus assumed to be used outdoors or semi-outdoors. Accordingly, the front plate is configured suitably of an inorganic material such as glass and tempered glass, or an organic material such as polycarbonate resin and acrylic resin in view of durability. The front plate may be tempered glass, film or the like configuring a touchscreen panel for example, as long as it has a Young's modulus equal to or greater than 2 GPa. The touchscreen panel is not limited in system, and an electrostatic capacitance system, a surface acoustic wave system, a resistive film system, an electromagnetic induction system, an optical sensor system, an infrared system, etc. are indicated as examples. The front plate may have functions such as antireflection, antifouling, electromagnetic wave shielding, near-infrared shielding, color adjustment, prevention of scattering of glass, and the like. The front plate having such functions may have at least one or more film layers that have these functions laminated on at least one surface of the front plate. The front plate of such a multi-layered structure can be fabricated for example by applying directly on the substrate formed of the above-indicated inorganic or organic materials an agent that is effective to provide the above function(s) or by sticking on the substrate a functional film separately produced and having the above function(s).

The ultraviolet curing type resin or pressure sensitive adhesive that sticks the front plate and the front-side polarizing plate together is suitably what has a refraction index close to that of the front plate and is transparent. Such an ultraviolet curing type resin or pressure sensitive adhesive can eliminate reflection and scattering of light at an interface of the front plate and the polarizing plate to improve visibility.

The ultraviolet curing type resin can be a general ultraviolet curable liquid material such as (metha)acrylic ester and epoxy resin. The pressure sensitive adhesive can be that with an acrylic polymer, a silicone-based polymer, polyester, polyurethane, polyether, etc. as a base polymer. Inter alia it is preferable to use an acrylic pressure sensitive adhesive excellent in optical transparency and having high transparency, such as an acrylic pressure sensitive adhesive. Herein, "(metha)acrylic ester" means acrylic ester and/or methacrylic ester, and "(media)" in (metha)acrylate or the like is also the same in meaning.

In the set of polarizing plates of the present invention, while polarizer 37 configuring the front-side polarizing plate and polarizer 57 configuring the back-side polarizing plate disposed on the back side of the liquid crystal cell are not limited to any particular thickness, the polarizer configuring the front-side polarizing plate typically has a thickness of 5 μm or more and 30 μm or less and the polarizer of the back-side polarizing plate on the back side of the liquid crystal cell typically has a thickness of 3 μm or more and 25 μm or less.

The polarizer used for the front- and back-side polarizing plates may be any appropriate polarizer that satisfies the thickness of the polarizer indicated above. As the polarizer, a polyvinyl alcohol-based resin film having a dichroic colorant adsorbed and oriented therein is used. The polyvinyl alcohol-based resin configuring the polarizer can be obtained by saponifying polyvinyl acetate-based resin. Examples of the polyvinyl acetate-based resin include polyvinyl acetate that is a homopolymer of vinyl acetate, and in addition, a copolymer of vinyl acetate and other monomer copolymerizable therewith, and the like. The other monomer copolymerizable with vinyl acetate can for example be unsaturated carboxylic acids, olefins, vinyl ethers, unsaturated sulfonic acids, acrylamides having an ammonium group, and the like. The degree of saponification of the polyvinyl alcohol-based resin is normally approximately 85 to 100 mol %, preferably 98 mol % or greater. The polyvinyl alcohol-based resin may further be modified, and, for example, polyvinyl formal, polyvinyl acetal, etc. modified with aldehydes can also be used. The degree of polymerization of the polyvinyl alcohol-based resin is normally approximately 1,000 to 10,000, preferably approximately 1,500 to 5,000. The polyvinyl alcohol-based resin and the dichroic colorant are specifically exemplified by those indicated in Japanese Patent Laying-Open No. 2012-159778 as examples.

A film formed of the above polyvinyl alcohol-based resin is used as a raw film for the polarizer. The method of forming a film of the polyvinyl alcohol-based resin is not limited to any particular method, and the film can also be formed in a known method. Although the thickness of the raw film formed of the polyvinyl alcohol-based resin is not limited to a particular thickness, it is approximately 1 to 150 μm, for example. Further taking ease of stretching into consideration, the thickness is preferably 3 μm or more and 75 μm or less.

The polarizer is produced for example by a step of uniaxially stretching the above-described polyvinyl alcohol-based resin film, a step of coloring the polyvinyl alcohol-based resin film with the dichroic colorant to cause the film to adsorb the dichroic colorant, a step of treating the polyvinyl alcohol-based resin film that has the dichroic colorant adsorbed therein with an aqueous solution of boric acid, a step of washing the film with water after the treatment with the aqueous solution of boric acid, and finally drying the film. In the process for producing the polarizer, the polyvinyl alcohol-based resin film may be stretched, colored, treated with boric acid, washed with water, and dried pursuant to a method described for example in Japanese Patent Laying-Open No. 2012-159778. The method described in this document may be employed to coat a substrate film with polyvinyl alcohol-based resin to form a polyvinyl alcohol-based resin layer serving as a polarizer on which a protective layer of transparent polymer film is laminated to produce a polarizing plate.

The front- and back-side polarizing plates as defined by the present invention both have a protective layer composed of a transparent polymer film (in the present specification, also referred to as a transparent protective layer) laminated on at least one surface of a polarizer produced as described above. As the transparent protective layer, what is formed of an appropriate transparent resin can be used. Specifically, what is made of a polymer excellent in transparency, uniform optical characteristics, mechanical strength, thermal stability, etc. is preferably used. The transparent protective layer can for example be, but is not limited to, cellulose-based film such as triacetyl cellulose and diacetyl cellulose; polyester-based film such as polyethylene terephthalate, polyethylene isophthatate, and polybutylene terephthalate; acrylic resin-based film such as polymethyl (metha)acrylate and polyethyl (metha)acrylate; polycarbonate-based film; polyether sulfone-based film; polysulfone-based polyimide-based film; polyolefin-based film; polynorbornene-based film; and the like.

The transparent protective layer applied to the front-side polarizing plate and the transparent protective layer applied to the back-side polarizing plate may be identical to each other or independently different from each other. Both or one of the transparent protective layers closer to the liquid crystal cell (in FIG. 1, 35b or 55a) may be dispensed with. In the present invention, preferably, the liquid-crystal-cell-side transparent protective layer in at least one polarizing plate has in-plane phase retardation. The front side's transparent protective films (in FIGS. 1, 35a and 35b) may both be phase retardation plates having in-plane phase retardation.

The in-plane phase retardation of the transparent protective layer can be provided by uniaxial stretching or biaxial stretching. While its in-plane phase retardation value may be set as appropriate in accordance with the type of the liquid crystal cell applied, generally it is out preferably to 30 nm or more. Although the upper limit of the in-plane phase retardation value is not limited to any particular value, for example a value up to approximately 300 nm is sufficient.

In-plane phase retardation value $R_0$ is defined by the following formula (I):

$$R_0 = (n_x - n_y) \times d \qquad (I),$$

where $n_x$ represents a refractive index of the transparent protective layer in the direction of an in-plane slow axis thereof, $n_y$ represents a refractive index of the transparent protective layer in the direction of an in-plane fast axis thereof (i.e., a direction orthogonal to the direction of the in-plane slow axis), and d represents the thickness of the transparent protective layer.

The polarizer and the transparent protective layer can be stuck together using an adhesive or a pressure sensitive adhesive. The adhesive can be an aqueous adhesive containing polyvinyl alcohol-based resin, urethane resin or the like as a major component; a photo-curing type adhesive including photo-curing type resin such as ultraviolet curing type resin (epoxy-based resin); and/or the like. The pressure sensitive adhesive can be that with an acrylic polymer, a silicone-based polymer, polyester, polyether, etc. as a base polymer.

Before being stuck on the polarizer, the surface of the transparent protective layer at which the transparent protective layer is stuck on the polarizer may undergo a saponification treatment, a corona treatment, primer treatment, anchor coating treatment and/or the like to help adhesion.

The front- and back-side polarizing plates have the transparent protective layer with a thickness normally in a range of approximately 5 to 200 μm, preferably 10 μm or more and 80 μm or less, more preferably 40 μm or less.

When front-side polarizing plate 30 includes layer 35a of protective layer laminated on a side of polarizer 37 closer to the front plate, this protective layer may have a surface (a side closer to the front plate) provided with a surface treatment layer such as a hard coat layer, an antireflection layer, an anti-glare layer and/or the like, if necessary. The hard coat layer is a surface treatment layer formed to prevent a scratch of a surface of the polarizing plate, and mainly from ultraviolet curing type resin, e.g., among acrylic resin, silicone-based resin and/or the like, what is excellent in adhesiveness to the transparent protective layer, hardness and the like is selected as appropriate, and can be formed on a surface of the transparent protective layer.

The antireflection layer is a surface treatment layer formed for the purpose of preventing reflection of external light at a surface of the polarizing plate and can be formed in a known method. The anti-glare layer is a surface treatment layer formed to prevent impaired visibility resulting from a glare of external light in a surface of the polarizing plate, and generally the anti-glare layer is formed for example by surface roughening such as sandblasting, embossing, or the like; mixing transparent fine particles with an ultraviolet curing type resin; or the like to allow the transparent protective layer to have a surface with an irregular configuration.

A polarizer having the above transparent protective layer stuck on at least one surface of the polarizer will serve as a polarizing plate. The polarizing plate may have the above transparent protective layer stuck on the opposite surfaces of the polarizer. Sticking the polarizer and the transparent protective layer together may be, but is not limited to, using an adhesive formed of an epoxy-based polymer, pressure sensitive adhesive or the like. Such an adhesive layer or pressure sensitive adhesive layer is formed as a layer of an applied and dried aqueous solution, etc. In preparing the aqueous solution, another additive, or a catalyst such as an acid can also be blended together as required.

The set of polarizing plates of the present invention can have the polarizing plates with the transparent polymer film and in addition thereto one or two or more optical films having the functions indicated below laminated. Such optical film can for example be a reflective layer, a semitransparent reflective layer, and a brightness enhancement film and the like. For example, the polarizing plate may be composed of said polarizer and transparent protective layer, and furthermore, a brightness enhancement film laminated thereon.

The set of polarizing plates of the present invention may have the polarizing plates with one or two or more phase retardation plates laminated. For example, it is exemplified by an elliptically or circularly polarizing plate having a phase retardation plate further laminated on the above-described polarizing plate including a polarizer and a transparent protective layer, and a polarizing plate having the above-described polarizing plate including a polarizer and a transparent protective layer with one side (or one protective layer) serving as an angle-of-visibility compensation film.

The phase retardation plate is a λ plate (a ½ λ plate or a ¼ λ plate) that can form a composite polarizing plate of an elliptical or circular polarization mode that is used for an image display device used in a mobile application, in particular, and the phase retardation plate is laminated on the above-described protective layer and used effectively. The composite polarizing plate of the elliptical or circular polarization mode has a function so that when the incident polarization direction is linear polarization it is changed to elliptical polarization or circular polarization and when the incident polarization direction is elliptical or circular polarization it is changed to linear polarization. In particular, as a phase retardation plate that can change elliptical polarization or circular polarization to linear polarization and can change linear polarization to elliptical polarization or circular polarization, what is called a ¼ λ plate is used. Furthermore, a ½ λ plate has a function to change linear polarization in direction.

A specific example of the phase retardation plate is a stretched film obtained by stretching a polymer selected from a polycarbonate-based polymer, a polyvinyl alcohol-based polymer, a polystyrene-based polymer, a polymethyl methacrylate-based polymer, a polyolefin-based polymer such as polypropylene, a polyarylate-based polymer, a polyamide-based polymer, a polyolefin-based polymer, a polynorbornene-based polymer, and the like. Such a stretched film may be a film processed in an appropriate method such as uniaxial stretching, biaxial stretching or the like. Furthermore, it may be a birefringent film controlled in refractive index in the thickness direction of the film by applying shrinking force and/or stretching force to the film under the condition where the film is adhered to a heat shrinkable film.

The brightness enhancement film is used for the purpose of improvement in brightness in liquid crystal display devices etc., and its specific examples include a reflection type polarization separation sheet designed to introduce anisotropy in reflectance by laminating a plurality of thin films mutually different in refractive index anisotropy, and a circular polarization separation sheet formed of a film substrate and an oriented film of a cholesteric liquid polymer, an oriented liquid crystal layer thereof or the like supported on the film substrate.

The above variety of optical films are integrated with the polarizing plate using a pressure sensitive adhesive or adhesive, which is not limited to any specific pressure sensitive adhesive or adhesive and may be any pressure sensitive adhesive or adhesive selected as appropriate. Preferably, the pressure sensitive adhesive is used in view of convenience in a bonding process, prevention of optical distortion, etc. The pressure sensitive adhesive is not limited to any specific one and can for example be that with an acrylic polymer, a silicone-based polymer, polyester, polyurethane, polyether, etc. as a base polymer. Inter alia, it is preferable to select and use a pressure sensitive adhesive that is excellent in transparency, holds appropriate wettability and cohesive strength, also presents excellent adhesion to the substrate, and furthermore, has satisfactory thermal resistance and can avoid problems such as loosening, peeling and the like in a high temperature environment, such as an acrylic pressure sensitive adhesive.

The pressure sensitive adhesive may contain fine particles for presenting a light-scattering property if necessary, and may have blended therein glass fiber, glass beads, resin beads, a filler such as metallic powder or other inorganic powder, a pigment, a coloring agent, an antioxidant, an ultraviolet absorber, etc. The ultraviolet absorber includes a salicylic acid ester-based compound, a benzophenone-based compound, a benzotriazol-based compound, a cyanoacrylate-based compound, a nickel complex salt-based compound, and the like.

The protective layer configuring the polarizing plate or the transparent polymer film layer provided on the polarizing plate can be provided with a pressure sensitive adhesive layer to adhere to another member such as the liquid crystal cell. The pressure sensitive adhesive layer can be formed using a conventionally used, acrylic or similar pressure sensitive adhesive, as appropriate. In particular, an excellently heat resistant pressure sensitive adhesive layer is preferable in view of preventing peeling in a high temperature environment, preventing impaired optical characteristics and the front-plate-integrated liquid crystal display panel's warping attributed to thermal expansion difference or the like, and hence forming a high quality and excellently durable liquid crystal image device, etc. The pressure sensitive adhesive layer is only required to be provided on a surface so required, as required, and for example when the transparent protective layer of the polarizing plate formed of the polarizer and the transparent protective layer is referred to, providing the pressure sensitive adhesive layer on one or the opposite surfaces of the transparent protective layer, as required, suffices. The pressure sensitive adhesive layer can for example be acryl-based, silicone-based, polyester-based, polyurethane-based, polyether-based, rubber-based or the like as appropriate.

Back-side polarizing plate 50 preferably has one or two or more of such optical films as described above laminated on an outermost surface opposite to liquid crystal cell 60 (i.e., a side farther away from the front plate's side). As such an optical film, a brightness enhancement film is mentioned.

Preferably, the pressure sensitive adhesive layer disposed on the polarizing plate, the optical film, and the like is temporarily covered with a separator for the purpose of preventing contamination until the pressure sensitive adhesive layer is served for sticking a film. The separator can be formed by providing an appropriate film pursuant to the above transparent protective layer or the like with a peeling coat provided by an appropriate peeling agent such as a silicone-based peeling agent, along chain alkyl-based peeling agent, a fluorine-based peeling agent, molybdenum sulfide or the like if necessary.

The set of polarizing plates of the present invention is provided such that the shorter side of the liquid crystal cell and the absorption axis of front-side polarizing plate 30 form an angle normally within ±45 degrees, preferably within ±10 degrees. The longer side of the liquid crystal cell and the absorption axis of the back-side polarizing plate form an angle normally within ±45 degrees, preferably within ±10 degrees. Front-side polarizing plate 30 more preferably has its absorption axis approximately parallel to the direction of the shorter side of the liquid crystal cell, and the back-side polarizing plate has its absorption axis approximately parallel to the direction of the longer side of the liquid crystal cell.

Figure 2:
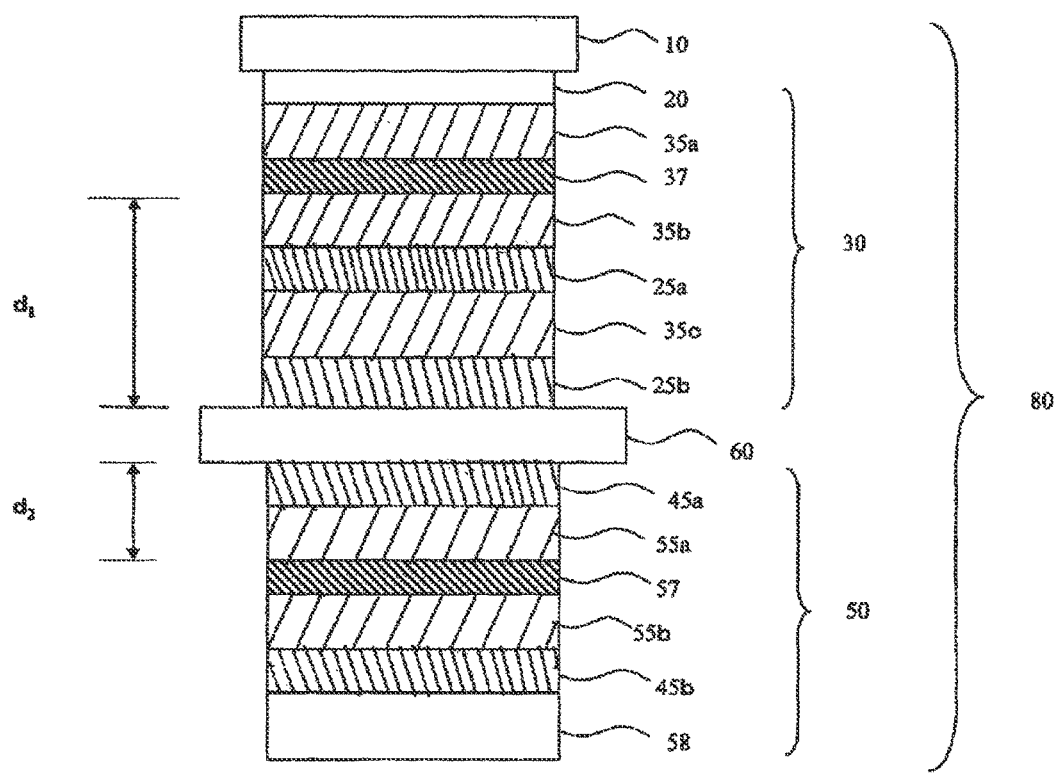
FIG. 2 is across-sectional view schematically showing an example of a preferable layer configuration in a front-plate-integrated liquid crystal display panel according to the present invention.

The front-plate-integrated liquid crystal display panel according to the present invention will now be described below. FIG. 2 is a cross-sectional view schematically showing an example of a preferable layer configuration in a front-plate-integrated liquid crystal display panel 80. As shown in FIG. 2, front-plate-integrated liquid crystal display panel 80 of the present invention is configured such that front-plate-integrated polarizing plate 40 configuring the set of polarizing plates of FIG. 1 is stuck on the viewing side of liquid crystal cell 60 and back-side polarizing plate 50 configuring the set of polarizing plates of FIG. 1 is stuck on the back side of liquid crystal cell 60, respectively, via a pressure sensitive adhesive.

Front-plate-integrated polarizing plate 40 and back-side polarizing plate 50 can be stuck on liquid crystal cell 60 using pressure sensitive adhesives 25b and 45a, respectively. The pressure sensitive adhesive can for example be that with an acrylic polymer, a silicone-based polymer, polyester, polyurethane, or polyether, etc. as a base polymer. It is preferable to use an acrylic pressure sensitive adhesive as it is excellent in optical transparency, has satisfactory thermal resistance and is thus less liable to problems such as loosening, peeling and the like in a high temperature environment, and is also advantageous in preventing impaired optical characteristics attributed to a thermal expansion difference or the like, suppressing the front-plate-integrated liquid crystal display panel's warping attributed to a thermal expansion difference and the like. Front-plate-integrated polarizing plate 40 and back-side polarizing plate 50 are stuck such that their shorter sides are parallel to the shorter sides of liquid crystal cell 60.

A driving triode of the liquid crystal cell may be any known triode such as a VA triode, an IPS mode, a TN mode, or the like, and the front-plate-integrated polarizing plate and the back-side polarizing plate are stuck on a liquid crystal cell substrate, which is typically made of glass or transparent resin, etc.

The front-plate-integrated liquid crystal display panel of the present invention warps in an amount in absolute value of 0.5 mm or less, preferably 0.3 mm or less when it is heated at 85° C. for 240 hours. The front-plate-integrated liquid crystal display panel can thus suppress warping in a high temperature environment and can be accommodated in a casing of a final product.

EXAMPLES

The present invention will be described more specifically below by way of Examples and Comparative Examples, but the present invention is not limited by these Examples. In Examples, % and part(s) expressing a content or a use amount are based on weight, unless otherwise indicated.

Example 1

(1) Fabrication of Set of Polarizing Plates

A front-side polarizing plate was fabricated as follows: A 30 μm-thick polyvinyl alcohol film (with an average polymerization degree of approximately 2,400 and a degree of saponification of 99.9 mol % or more) was uniaxially stretched by dry stretching with a stretching magnification of approximately five times and was immersed in pure water of 60° C. for one minute while maintaining the tension of the film and subsequently, immersed in an aqueous solution in which a weight ratio of iodine/potassium iodide/water was 0.05/5/100 at 28° C. for 60 seconds. Thereafter the film was immersed in an aqueous solution in which a weight ratio of potassium iodide/boric acid/water was 8.5/8.5/100 at 72° C. for 300 seconds. Subsequently, the film was washed with pure water of 26° C. for 20 seconds, and thereafter dried at 65° C. to obtain a polarizer having a thickness of 11 μm and formed of the polyvinyl alcohol film with iodine adsorbed and oriented therein. Then, on one side of the polarizer, an epoxy-based adhesive, which was prepared by dissolving 3 parts of a carboxyl group-modified polyvinyl alcohol [trade name: "KL-318" obtained from Kuraray Co., Ltd.] in 100 parts of water to obtain an aqueous solution and adding into the aqueous solution 1.5 parts of a polyamide epoxy-based additive of water-soluble epoxy resin [trade name: "Sumirez Resin 650(30)" obtained from Taoka Chemical Co., Ltd., an aqueous solution having a solid content concentration of 30%], was applied, and, as a protective layer of transparent polymer film, a 25 μm-thick triacetyl cellulose film (TAC) [trade name: "KC2UA" produced by Konica Minolta Opto Inc.] was stuck thereon, and on the opposite side the aforementioned adhesive was used to stick a transparent polymer film of a 20 μm-thick norbornene-based resin layer having an in-plane phase retardation of 90 nm [trade name: "ZEONOR" produced by Nippon Zeon Co., Ltd.]. Subsequently, on the ZEONOR surface's side, a 15 μm-thick pressure sensitive adhesive [trade name: "#3" produced by Lintec Corporation] was stuck, and thereon was stuck a phase retardation film that was a transparent polymer film having an in-plane phase retardation value of 60 nm and a thickness of 25 μm and obtained by stretching a laminated film of a 3-layer structure of a Core layer of a styrene-maleic anhydride-based copolymer resin [trade name: "Dylark D332" produced by Nova Chemical Japan Ltd.] and a skin layer of a methacrylic resin having acrylic rubber particles having an average particle diameter of 200 nm blended therein by approximately 20% [trade name: "Tekunoroi S001" produced by Sumitomo Chemical Co., Ltd.] that were three-layered-co-extruded such that such skin layers were provided on the opposite surfaces of the core layer.

Subsequently, a 25-μm-thick pressure sensitive adhesive [trade name: "P-119E" produced by Lintec Corporation] was stuck on the phase retardation film surface's side.

Thus, as the front-side polarizing plate, a polarizing plate was fabricated that was composed of a transparent protective layer (TAC)/a polarizer/a phase retardation plate (Zeonor)/a pressure sensitive adhesive/a phase retardation plate/a pressure sensitive adhesive (of 25/11/20/15/25/25, respectively, in thickness, as layers, respectively, in micrometers) laminated successively in this order as seen from the side stuck to the front plate.

The transparent polymer films configuring the front-side polarizing plate (i.e., the TAC and the two phase retardation plates) had a total thickness of 70 μm.

The back-side polarizing plate had a polarizer produced in a method similar to that employed for the front-side polarizing plate, and a method similar to that employed for the front-side polarizing plate was employed to stick a 25 μm-thick triacetyl cellulose film [trade name: "KC2UA" produced by Konica Minolta Opto Inc.] as a protective layer of the transparent polymer film and on the opposite side the aforementioned adhesive was used to stick a transparent polymer film of an unstretched, 23 μm-thick norbornene-based resin film [trade name: "ZEONOR" produced by Nippon Zeon Co., Ltd.]. Thereafter, on the TAC surface's side, a 5 μm-thick pressure sensitive adhesive [trade name: "#L2" produced by Lintec Corporation] was stuck, and thereon, a brightness enhancement film of 26 μm in thickness [trade name: "Advanced Polarized Film, Version 3" produced by 3M Company] was stuck. Subsequently, a 25-μm-thick pressure sensitive adhesive [trade name: "P-119E" produced by Lintec Corporation] was stuck on the norbornene-based resin's side.

Thus, the back-side polarizing plate was fabricated as a polarizing plate composed of a pressure sensitive adhesive/a transparent protective layer (trade name: "ZEONOR" produced by Nippon Zeon Co., Ltd.)/a polarizer/a transparent protective layer (TAC)/a pressure sensitive adhesive/a brightness enhancement film (of 25/23/11/25/5/26, respectively, in thickness, as layers, respectively, in micrometers) laminated successively in this order as seen from the side closer to the front-side polarizing plate.

The transparent polymer films configuring the back-side polarizing plate (i.e., the TAC and the norbornene-based resin film unstretched) had a total thickness of 48 μm.

(Fabrication of Front-Plate-Integrated Liquid Crystal Display Panel)

The set of polarizing plates fabricated as above was stuck on a liquid crystal cell in the following method to fabricate a front-plate-integrated liquid crystal display panel.

The front-side polarizing plate was cut to have a size of 5 inches such that the absorption axis of the polarizer was parallel to the shorter side of the liquid crystal cell, and the back-side polarizing plate was also cut to have a size of 5 inches such that the absorption axis of the polarizer was parallel to the longer side of the liquid crystal cell. The cut polarizing plates were then stuck on the liquid crystal cell on their respective pressure sensitive adhesives' sides, respectively, and then on the side of the triacetyl cellulose film of the front-side polarizing plate an ultraviolet curing type optical elastic resin [trade name: "Super View Resin" produced by Dexerials Corporation] was applied and thereon a front plate having a Young's modulus of 70 GPa and having a thickness of 0.55 mm [trade name: "Gorilla" produced by Corning Incorporated] was laminated. Then ultraviolet rays ["D valve" produced by Fusion UV Systems Inc., integrated quantity of light: 1200 mJ/cm$^2$] was emitted from the front plate's side to thus fabricate a front-plate-integrated liquid crystal display panel.

(Measurement of Warping Amount)

The warping amount in a high temperature environment of the front-plate-integrated liquid crystal display panel fabricated above, was measured in the following method. Initially the fabricated front-plate-integrated liquid crystal display panel was left in an environment of 85° C. for 240 hours and thereafter, with the front plate facing upward, placed on the measuring table of a two-dimensional measurement instrument "NEXIV VMR-12072" produced by Nikon Corporation. The instrument was focused on a surface of the measuring table, and with reference thereto the instrument was focused on the front-plate-integrated liquid crystal display panel at the four corners, the four sides' respective centers, and a surface's center and measured their distances from the focal point serving as the reference, and a distance from the measuring table that is the largest in absolute value was determined as an amount of warping. The measurement result is shown in Table 1 at the field "warping amount."

Example 2

The front-side polarizing plate was fabricated as follows: Initially, an aqueous solution of polyvinyl alcohol was applied on a substrate film and dried to provide a laminated film serving as a raw film for producing the polarizer. Herein, a polypropylene film having a thickness of 110 μm and a melting point of 163° C. was used as the substrate film.

Acetoacetyl group modified polyvinyl alcohol powder having an average polymerization degree of 1,100 and a degree of saponification of 99.5 mol % [trade name: "Gohsefimer Z-200" produced by The Nippon Synthetic Chemical industry Co., Ltd.] was dissolved in hot water of 95° C. to prepare an aqueous solution of a concentration of 3%. Into this aqueous solution, a cross-linking agent of a water-soluble polyamide epoxy resin [trade name: "Sumirez Resin 650" produced by Taoka Chemical Co., Ltd., an aqueous solution having a solid content concentration of 30%] was mixed at a ratio of 5 parts per 6 parts of a solid content of polyvinyl alcohol to prepare a coating liquid for primer.

Then the substrate film of polypropylene was subjected to a corona treatment and the corona-treated surface was coated with the coating liquid for primer using a micro gravure coater, and the substrate film was then dried at 80° C. for 10 minutes to form a 0.2 μm-thick primer layer.

Then, polyvinyl alcohol powder having an average polymerization degree of 2,400 and a degree of saponification of 98.0 to 99.0 mol % [trade name: "PVA124" obtained from Kuraray Co., Ltd.] was dissolved in hot water of 95° C. to prepare an aqueous solution of polyvinyl alcohol of a concentration of 8%. The obtained aqueous solution was applied on the primer layer of the above substrate film using a lip coater at room temperature, and dried at 80° C. for 20 minutes to provide laminated film composed of the substrate film/the primer layer/a polyvinyl alcohol layer.

Then the obtained laminated film was subjected to a free end longitudinal uniaxial stretching treatment at 160° C. with a stretching magnification of 5.8 times. The stretched laminated film thus obtained had a total thickness of 28.5 μm and the polyvinyl alcohol layer had a thickness of 5.0 μm.

The stretched laminated film thus obtained was immersed in an aqueous solution in which a weight ratio of water/iodine/potassium iodide was 100/0.35/10 at 26° C. for 90 seconds so as to be colored, and thereafter the film was washed with pure water of 10° C. The stretched laminated film was then immersed in an aqueous solution in which a weight ratio of water/boric acid/potassium iodide was 100/9.5/5 at 76° C. for 300 seconds to crosslink the polyvinyl alcohol. Then, the film was washed with pure water of 10° C. for 10 seconds and finally dried at 80° C. for 200 seconds. A polarizing laminated film was thus fabricated that was composed of a polypropylene substrate film and a polarizer deposited on the film substrate and formed of a polyvinyl alcohol layer having iodine adsorbed and oriented therein.

On a surface of the produced polarizing laminated film opposite to the substrate film, (i.e., on the polarizer's surface), an epoxy-based adhesive, which was prepared by dissolving 3 parts of a carboxyl group-modified polyvinyl alcohol [trade name: "KL-318" obtained from Kuraray Co., Ltd.] in 100 parts of water to obtain an aqueous solution and adding into the aqueous solution 1.5 parts of a polyamide epoxy-based additive of water-soluble epoxy resin [trade name: "Sumirez Resin 650(30)" obtained from Taoka Chemical Co., Ltd., an aqueous solution having a solid content concentration of 30%], was applied, and, as a protective layer of transparent polymer film, a 25 μm-thick triacetyl cellulose film (TAC) [trade name: "KC2UA" produced by Konica Minolta Opto Inc.] was stuck thereon, and the substrate film was alone peeled off and a polarizing plate composed of TAC/a polyvinyl alcohol-based polarizer/a primer layer was thus obtained.

Then, an ultraviolet curing type adhesive containing an epoxy compound and a photocationic polymerization initiator was applied on the side of the surface of the primer layer and a film which was an unstretched transparent polymer film of norbornene-based resin (trade name: "ZEONOR" produced by Nippon Zeon Co., Ltd.) was stuck thereon and ultraviolet ray exposure ["D valve" produced by Fusion UV Systems Inc., with an integrated quantity of light of 1200 mJ/cm$^2$] was performed at the norbornene-based resin's side to cure the adhesive to obtain a polarizing plate composed of a TAC/a polyvinyl alcohol-based polarizer/a primer layer/a norbornene-based resin layer.

Subsequently, a 25-μm-thick pressure sensitive adhesive [trade name: "P-119E" produced by Lintec Corporation] was stuck on the side of the norbornene-based resin layer (thickness: 23 μm). The transparent polymer films configuring the front-side polarizing plate (i.e., the TAC and the norbornene-based resin layer) had a total thickness of 48 μm.

The back-side polarizing plate was fabricated as follows: A method similar to that used for the front-side polarizing plate was used to obtain a polarizing plate composed of TAC/a polyvinyl alcohol-based polarizer/a primer layer, and subsequently, on the TAC surface's side, a 5 μm-thick pressure sensitive adhesive [trade name: "#L2" produced by Lintec Corporation] was stuck, and thereon, a brightness enhancement film of 26 μm in thickness [trade name: "Advanced Polarized Film, Version 3" produced by 3M Company] was stuck.

Subsequently, a 25-μm-thick pressure sensitive adhesive [trade name: "P-119E" produced by Lintec Corporation] was stuck directly on the polarizer. The transparent polymer film configuring the back-side polarizing plate (i.e., the TAC) had a total thickness of 25 μm.

The set of polarizing plates fabricated as above was stuck on a liquid crystal cell, similarly as done in Example 1, to fabricate a front-plate-integrated liquid crystal display panel and its warping amount in a high temperature environment was measured. The result is shown in Table 1.

Example 3

The front-side polarizing plate was produced as follows. Initially, on a transparent polymer film of a 20-μm-thick norbornene-based resin having an in-plane phase retardation of 90 nm (trade name: "ZEONOR" produced by Nippon Zeon Co., Ltd.), a curable resin was applied by a thickness of 1 μm. The curable resin was a solution containing N-(2-hydroxyethyl) acrylamide and methyl acrylate mixed together at a ratio of 80 parts and 20 parts, respectively, with three parts of photo-radical polymerization initiator [trade name: "Irgacure 907" produced by BASF] and 0.2 part of a silicone-based leveling agent [trade name: "SH710" produced by Dow Corning Toray Co., Ltd.] added thereto. Subsequently, on the transparent polymer film was stuck a phase retardation film that was a transparent polymer film having an in-plane phase retardation value of 60 nm and a thickness of 25 μm obtained by stretching a laminated film of a 3-layer structure of a core layer of a styrene-maleic anhydride-based copolymer resin [trade name: "Dylark D332" produced by Nova Chemical Japan Ltd.] and a skin layer of a methacrylic resin having acrylic rubber particles having an average particle diameter of 200 nm blended therein by approximately 20% [trade name: "Tekunoroi S001" produced by Sumitomo Chemical Co., Ltd.] that were three-layered-co-extruded such that such skin layers were provided on the opposite surfaces of the core layer. Furthermore, the obtained laminate was exposed on the norbornene-based resin's side to ultraviolet radiation ["D valve" produced by Fusion UV Systems Inc., with an integrated quantity of tight of 250 mJ/cm$^2$] to cure the curable resin to obtain a composite phase retardation plate that was a 46-μm-thick transparent polymer film.

Then, a 30 μm-thick polyvinyl alcohol film (with an average polymerization degree of approximately 2,400 and a degree of saponification of 99.9 mol % or more) was uniaxially stretched by dry stretching with a stretching magnification of approximately five times and was immersed in pure water of 60° C. for one minute while maintaining the tension of the film and subsequently, immersed in an aqueous solution in which a weight ratio of iodine/potassium iodide/water was 0.05/5/100 at 28° C. for 60 seconds. Thereafter the film was immersed in an aqueous solution in which a weight ratio of potassium iodide/boric acid/water was 8.5/8.5/100 at 72° C. for 300 seconds. Subsequently, the film was washed with pure water of 26° C. for 20 seconds, and thereafter dried at 65° C. to obtain a polarizer having a thickness of 11 μm and formed of the polyvinyl alcohol film with iodine adsorbed and oriented therein. Then, on one side of the polarizer, an epoxy-based adhesive, which was prepared by dissolving 3 parts of a carboxyl group-modified polyvinyl alcohol [trade name: "KL-318" obtained from Kuraray Co., Ltd.] in 100 parts of water to obtain an aqueous solution and adding into the aqueous solution 1.5 parts of a polyamide epoxy-based additive of water-soluble epoxy resin [trade name: "Sumirez Resin 650(30)" obtained from Taoka Chemical Co., Ltd., an aqueous solution having a solid content concentration of 30%], was applied, and, as a protective layer of transparent polymer film, a 25 μm-thick triacetyl cellulose film (TAC) [trade name: "KC2UA" produced by Konica Minolta Opto Inc.] was stuck thereon, and on the opposite side, the aforementioned adhesive was used to stick the composite phase retardation plate.

Subsequently, a 25-μm-thick pressure sensitive adhesive [trade name: "P-119E" produced by Lintec Corporation] was stuck on the composite phase retardation plates side.

Thus, the from-side polarizing plate was fabricated as a polarizing plate that was composed of a transparent protective layer (TAC)/a polarizer/a phase retardation plate/a UV adhesive layer/a phase retardation plate/a pressure sensitive adhesive (of 25/11/20/1/25/25, respectively, in thickness, as layers, respectively, in micrometers) laminated successively in this order as seen from the side stuck to the front plate.

The transparent polymer films configuring the obtained front-side polarizing plate (i.e., the TAC and the two phase retardation plates) had a total thickness of 71 μm.

The thus produced front-side polarizing plate and a back-side polarizing plate that was a back-side polarizing plate produced in Example 2 were used to fabricate a front-plate-integrated liquid crystal display panel, similarly as done in Example 1, and its warping amount in a high temperature environment was measured. The result is shown in Table 1.

Comparative Example 1

As a front-side polarizing plate stuck on a liquid crystal cell, the back-side polarizing plate used in Example 1 minus the pressure sensitive adhesive and brightness enhancement film on the side of the TAC surface, i.e., a polarizing plate composed of a pressure sensitive adhesive/a transparent protective layer (trade name: "ZEONOR" produced by Nippon Zeon Co., Ltd.)/a polarizer/a transparent protective layer (TAC) (of 25/23/11/25, respectively, in thickness, as layers, respectively, in micrometers) laminated successively in this order, was used as the front-side polarizing plate, and it had its TAC surface stuck on a front plate via an ultraviolet curing type optical elastic resin, as done in Example 1, and was stuck on the liquid crystal cell via a pressure sensitive adhesive of said laminate.

As a back-side polarizing plate stuck on the liquid crystal cell, the front-side polarizing plate used in Example 1 with the TAC surface's side having a 5 μm-thick pressure sensitive adhesive [trade name: "#L2" produced by Lintec Corporation] stuck thereon and a 26-μm-thick brightness enhancement film [trade name: "Advanced Polarized Film Version 3" produced by 3M Company] stuck thereon, was used and stuck on a side of the liquid crystal cell opposite to the polarizing plate of the side of the front plate using the same pressure sensitive adhesive as used in Example 1. The liquid crystal panel thus produced was exposed to a high temperature environment similarly as done in Example 1 and its warping amount was measured. The result is shown in Table 1 at the field "warping amount."

TABLE 1

| | distance from polarizer | | total thickness of transparent polymer film(s) | | display panel |
|---|---|---|---|---|---|
| | front side | back side | front side | back side | warping amount |
| Example 1 | 85 μm | 48 μm | 70 μm | 48 μm | 0.10 mm |
| Example 2 | 48 μm | 25 μm | 48 μm | 25 μm | 0.15 mm |
| Example 3 | 71 μm | 25 μm | 71 μm | 25 μm | 0.30 mm |
| Comparative Example 1 | 48 μm | 85 μm | 48 μm | 70 μm | 1.10 mm |

Front side: a distance to the liquid crystal cell from that surface of the polarizer of the front-side polarizing plate which is farther away from the front plate.

Back side: a distance to the liquid crystal cell from that surface of the polarizer of the back-side polarizing plate which is closer to the front plate.

The front-plate-integrated liquid crystal display panels of Examples 1-3 provide warping in an amount of 0.30 mm or less at the polarizing plate of the front side of the liquid crystal cell when heated at 85° C. for 240 hours. Furthermore, in Examples 1-3, the total thickness of the transparent polymer film(s) configuring the front-side polarizing plate is larger than the total thickness of the transparent polymer film(s) configuring the back-side polarizing plate.

REFERENCE SIGNS LIST

10: front plate
20: pressure sensitive adhesive or ultraviolet curing type resin
25a, 25b: pressure sensitive adhesive
30: front-side polarizing plate
35a, 35b: transparent protective layer of front-side polarizing plate
37: polarizer of front-side polarizing plate
40: front-plate-integrated polarizing plate
45a, 45b: pressure sensitive adhesive
50: back-side polarizing plate 55a, 55b: transparent protective layer of back-side polarizing plate
57: polarizer of back-side polarizing plate
58: brightness enhancement film
60: liquid crystal cell
80: front-plate-integrated liquid crystal display panel
d1: a distance to the liquid crystal cell from that surface of the polarizer of the front-side polarizing plate which is farther away from the front plate.
d2: a distance to the liquid crystal cell from that surface of the polarizer of the back-side polarizing plate which is closer to the front plate.

The invention claimed is:

1. A set of polarizing plates comprising a front-plate-integrated polarizing plate to be disposed at a viewing side of a liquid crystal cell, and a back-side polarizing plate to be disposed at a back side of the liquid crystal cell, the front-plate-integrated polarizing plate including a front-side polarizing plate and a front plate, the front plate being disposed at a viewing side of the front-side polarizing plate, being stuck via an ultraviolet curing type resin or a pressure sensitive adhesive, and having a Young's modulus equal to or greater than 2 GPa, wherein
both the front- and back-side polarizing plates are each a polarizing plate having a polarizer composed of a polyvinyl alcohol-based resin film having at least one surface with a transparent protective layer composed of a transparent polymer film laminated thereon,
a distance d1 to the liquid crystal cell from that surface of a polarizer of the front-side polarizing plate which is farther away from the front plate is larger than a distance d2 to the liquid crystal cell from that surface of a polarizer of the back-side polarizing plate which is closer to the front plate,
d1 is 100 μm or less, and d2 is 5 μm or more, and
a total thickness of one or more transparent polymer films that the front-side polarizing plate has is larger than a total thickness of one or more transparent polymer films that the back-side polarizing plate has.

2. The set of polarizing plates according to claim 1, wherein a transparent protective layer composed of a transparent polymer film having an in-plane phase retardation is laminated on a surface of at least one of that side of the polarizer of the front-side polarizing plate which is farther away from the front plate and that side of the polarizer of the back-side polarizing plate which is closer to the front plate.

3. The set of polarizing plates according to claim 2, wherein the front-side polarizing plate further comprises, on the side of its polarizer farther away from the front plate, another phase retardation plate composed of a transparent polymer film.

4. The set of polarizing plates according to claim 1, wherein the back-side polarizing plate is provided, on a side of its polarizer farther away from the front plate's side, with another optical film.

5. The set of polarizing plates according to claim 1, wherein both the front-side polarizing plate and the back-side polarizing plate have a rectangular shape having a longer side and a shorter side, and the front-side polarizing plate has its absorption axis approximately parallel to a direction of the shorter side and the back-side polarizing plate has its absorption axis approximately parallel to a direction of the longer side.

6. A front-plate-integrated liquid crystal display panel comprising the set of polarizing plates according to claim 1, and a liquid crystal cell, wherein
the front-plate-integrated polarizing plate is stuck, at its polarizing plate's side, on a viewing side of the liquid crystal cell; and
the back-side polarizing plate is stuck on a back side of the liquid crystal cell.

7. The front-plate-integrated liquid crystal display panel according to claim 6, having a warping amount in absolute value of 0.5 mm or less when heated at 85° C. for 240 hours.

8. A front-plate-integrated liquid crystal display panel comprising the set of polarizing plates according to claim 2, and a liquid crystal cell, wherein
the front-plate-integrated polarizing plate is stuck, at its polarizing plate's side, on a viewing side of the liquid crystal cell; and
the back-side polarizing plate is stuck on a back side of the liquid crystal cell.

9. A front-plate-integrated liquid crystal display panel comprising the set of polarizing plates according to claim 3, and a liquid crystal cell, wherein
the front-plate-integrated polarizing plate is stuck, at its polarizing plate's side, on a viewing side of the liquid crystal cell; and
the back-side polarizing plate is stuck on a back side of the liquid crystal cell.

10. A front-plate-integrated liquid crystal display panel comprising the set of polarizing plates according to claim 4, and a liquid crystal cell, wherein
the front-plate-integrated polarizing plate is stuck, at its polarizing plate's side, on a viewing side of the liquid crystal cell; and
the back-side polarizing plate is stuck on a back side of the liquid crystal cell.

11. A front-plate-integrated liquid crystal display panel comprising the set of polarizing plates according to claim 5, and a liquid crystal cell, wherein
the front-plate-integrated polarizing plate is stuck, at its polarizing plate's side, on a viewing side of the liquid crystal cell; and
the back-side polarizing plate is stuck on a back side of the liquid crystal cell.

\* \* \* \* \*